(12) United States Patent
Wang et al.

(10) Patent No.: US 10,197,678 B1
(45) Date of Patent: Feb. 5, 2019

(54) H-ARAIM SYSTEM OF OPTIMIZING A HORIZONTAL PROTECTION LEVEL

(71) Applicant: Beihang University, Beijing (CN)

(72) Inventors: Zhipeng Wang, Beijing (CN); Yanbo Zhu, Beijing (CN); Jingtian Du, Beijing (CN); Yuan Liu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/037,068

(22) Filed: Jul. 17, 2018

(51) Int. Cl.
G01S 19/20 (2010.01)
G01S 19/33 (2010.01)

(52) U.S. Cl.
CPC .............. G01S 19/20 (2013.01); G01S 19/33 (2013.01)

(58) Field of Classification Search
CPC ........ G01S 19/20; G01S 19/33; G01S 19/215; G01S 19/15; G01S 19/252; G01C 21/165
USPC .................................................... 342/357.58
See application file for complete search history.

(56) References Cited

U.S. PATENT DOCUMENTS 6,205,377 B1 * 3/2001 Lupash ................... G01S 19/20
342/357.58
2018/0081064 A1 * 3/2018 Skalicky ................. G01S 19/20

* cited by examiner

Primary Examiner — Harry K Liu
(74) Attorney, Agent, or Firm — Tim Tingkang Xia, Esq.; Locke Lord LLP

(57) ABSTRACT

An H-ARAIM system of optimizing a horizontal protection level includes constellations, a ground reference station and an aircraft, the ground reference station is used for receiving the satellite coordinate data of the constellations, and processing the received satellite coordinate data into an input data for the calculation of the aircraft horizontal protection level. The aircraft is built-in with a receiver and a data processor, the receiver is used for receiving the input data sent by the ground reference station, and transmitting the input data to the data processor for the data processing as follows: when a difference between a positioning solution of a full visible satellite and a positioning solution of a fault subset is within a threshold of a fault subset monitor system statistical magnitude, the receiver begins to calculate the protection level, which is calculated for protecting the iterative update.

10 Claims, 6 Drawing Sheets

H-ARAIM SYSTEM OF OPTIMIZING A HORIZONTAL PROTECTION LEVEL

CROSS-REFERENCE TO RELATED PATENT APPLICATION

This application claims priority to and the benefit of, pursuant to 35 U.S.C. § 119(a), patent application Serial No. CN201810692985.7 filed in China on Jun. 29, 2018. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The invention relates to the field of aerospace technology, in particular to an H-ARAIM system of optimizing a horizontal protection level.

BACKGROUND

An advanced Receiver Autonomous Integrity Monitor (ARAIM) is an important technology in the satellite navigation Augmentation System. As a typical onboard integrity monitoring technology, the ARAIM uses a redundancy measurement to quickly detect and eliminate the satellite faults and promptly alarm to the user.

The ARAIM allows a deviation of the descriptions for available $\sigma_{URA,i}$, $\sigma_{URE,i}$ and $b_{nom,i}$ to be present in the measurement signal of the satellite; however, if the signal deviation goes beyond the described range, the satellite is believed to be faulted. The receiver judges which of the fault modes need to be monitored according to $P_{sat,i}$ and $P_{const,j}$ in the ISM information. Each fault mode corresponds to a subset in which an assumed faulted satellite signal is removed. The ARAIM ensures the navigation integrity by comparing the position solution of the subset against the position solution of the full visible satellite. If the solution separation amount of each subset solution and the position solution of the full visible satellite is within a predetermined threshold, the receiver obtains the following outputs by calculation: Protection Levels (PL), Effective Monitor Threshold (EMT), and Standard deviation of the accuracy ($\sigma_{acc}$). Wherein, the bound between the detection threshold sum and the subset solution covariance error has to be large enough to envelope the error of the full visible satellite position solution within the protection level. The EMT ensures the internal threshold to be rigorous enough. $\sigma_{acc}$ provides a 99.99999% fault-free accuracy. The horizontal ARAIM(H-ARAIM) is one of three ARAIM working modes proposed in "the Second Milestone" issued by WG-C ARAIM Technical Team on February, 2015 (the other two modes are offline ARAIM and online ARAIM). The H-ARAIM mainly supports the ISM-based horizontal navigation and is extended to a multi-constellation based on the original RAIM technology. The multi-frequency allows the key integrity parameter to be altered through the ISM, while RAIM fixes these parameters within the receiver.

Currently, with the development of the global GNSS towards the multi-constellation, the multi-constellation H-ARAIM still presents the following problems: first, the classification for the fault subset is unreasonable; the existing ARAIM fault detection model is based on an idea of ergodic hypothesis; however, with the rapid increase of the number of the visible satellite, the calculation load also increases in folds, such that the availability prediction for the H-ARAIM cannot get the result quickly; second, the protection level estimation accuracy is low and the calculation speed is slow; in the calculation for the existing quality indexes such as the protection level and the like of the H-ARAIM, risks are averagely allocated to each fault subset; the obtained protection index level is not the optimal solution and is difficult to support the development requirements of the H-ARAIM and the related aerospace application.

For the first problem, scholars from Beijing University of Aeronautics and Astronautics propose a multi-constellation ARAIM fault detection mode based on an orbital plane. It is advantageous to quickly detect and eliminate faults by electing the constellation layer subset that fails the threshold test or has the largest test statistics to reduce the fault existence range, and thereafter electing the subset in the orbital plane corresponding to the constellation. With the premise of satisfying availability, the fault detection model using the orbit selection method for reducing the subset greatly simplifies the complexity of the ARAIM algorithm, reduces the calculation load, and is capable of ensuring the geometric integrity and is advantageous for quick detection and elimination of faults and real-time application.

For the second problem, with the modernization for GPS and GLONASS system and the development of BeiDou Navigation Satellite System (BDS) and Galileo, the number of the visible satellites certainly will increase, both navigation positioning accuracy and service reliability will be improved. However, more constellations and satellites also mean the increase of the possible fault modes of GNSS.

The reference MHSS algorithm is a commonly used user algorithm for ARAIM, which detects faults by comparing the solution of the full visible satellite and the subset solution assuming the removal of the faulted satellite. For the multi-constellation situation, a great number of subset solution in need of ARAIM receiver evaluation will be yielded, which greatly increases the calculation load.

For any phase of aviation flight, the safety risk limits that the aviation flight can bear in the corresponding standards are clearly established. Risks are from two aspects: one is an integrity risk, associating with a Missing Detection, (MD) probability; the other is a continuity risk, associating with a False Alarm (FA) probability. The more accurate the value of the protection level is, the user resistance against all of deviations may get more protection with a given risk value, and the higher the system availability is. Therefore, the protection level calculation relates to the allocation problems for the integrity and continuity risks, i.e., two extremely important and hark requirements that the civil aviation imposes on the satellite navigation system. The primary object for the optimization of the protection level calculation is to reasonably allocate the integrity risks and continuity risks of the satellite navigation system in each detection subset to obtain a more accurate protection level so as to realize the performance upgrade of H-ARAIM. The presently commonly used method for calculating the protection level are an average dichotomy in engineering and a theoretically target function method, however, in these two solving methods, the former one is too coarse to represent the reasonable allocation for the risks; the latter one is too complicated to use in the engineering application. On the other hand, the risk processing in the existing protection and calculation method is not suitable for the fault detection model using the orbit selection method. For the solution separation detection of the constellation layer subset solution, the continuity risks should be reasonably allocated at first, thereafter, the optimized allocation for the integrity risks should also be concerned when the protection level is solved at last.

Therefore, in order to address the abovementioned problems, there is a need for an H-ARAIM system of optimizing a horizontal protection level.

SUMMARY

The object of the invention is to provide an H-ARAIM system of optimizing a horizontal protection level, the system comprising constellations, a ground reference station and an aircraft, the ground reference station is used for receiving the satellite coordinate data of the constellations, and processing the received satellite coordinate data into an input data for the calculation of the aircraft horizontal protection level, the aircraft is built-in with a receiver and a data processor, the receiver is used for receiving the input data sent by the ground reference station, and transmitting the input data to the data processor for the data processing as follows: calculating a pseudo-range error diagonal covariance matrix to obtain a weighted matrix W, and calculating a positioning solution of a full visible satellite according to a satellite geometric matrix G and the weighted matrix W;

according to an input parameter acquired by the receiver from the ground reference station, calculating a maximum of the number of the simultaneously faulted constellations and a maximum of the number of the simultaneously faulted satellites in need of monitoring, determining a maximum of the number of the orbital plane to be removed, so as to obtain the number of the fault subset;

calculating positioning solutions for each fault subset by the difference between the positioning solution of the full visible satellite and the positioning solution of the fault subset;

performing a constellation layer continuity risk allocation and an orbital plane continuity risk allocation on each fault subset according to the number of the satellite;

when a difference between a positioning solution of the full visible satellite and a positioning solution of the fault subset is within a threshold of a fault subset monitor system statistical magnitude, calculating the threshold of the fault subset test statistics;

when the receiver begins to calculate the protection level, the protection level is calculated by the following method:

calculating a protection level lower limit and a protection level upper limit and a midpoint between the protection level upper limit and the protection level lower limit, when the protection level takes the midpoint, if $\log PHMI_{HOR} \leq \log f(HPL_{low,init})$, then:

$$HPL_{low} = HPL_{mid}$$
$$HPL_{low,old} = HPL_{low,init},$$

looping through $$HPL_{low,new} =$$
$$HPL_{low} - \frac{\log f(HPL_{low})}{\log f(HPL_{low}) - \log f(HPL_{low,old})}(HPL_{low} - HPL_{low,old}),$$

a loop condition is: $|HPL_{low,new} - HPL_{low}| \leq TOL_{PL}$, an output protection level is: $HPL = HPL_{low,new}$;

otherwise:

$$HPL_{up} = HPL_{mid}$$
$$HPL_{up,old} = HPL_{up,init},$$

looping through:

$$HPL_{up,new} =$$
$$HPL_{up} - \frac{\log f(HPL_{up})}{\log f(HPL_{up}) - \log f(HPL_{up,old})}(HPL_{up} - HPL_{up,old}),$$

the loop condition is: $|HPL_{up,new} - HPL_{up}| \leq TOL_{PL}$, the output production level is: $HPL = HPL_{up,new}$;

wherein, $PHMI_{HOR}$ is a total integrity budget horizontal component, $HPL_{low}$ is a protection level lower limit, $HPL_{low,init}$ is an initial value of the protection level lower limit, $HPL_{low,old}$ is a stop value of the protection level lower limit, and $HPL_{low,new}$ is an updated value of the protection level lower limit;

$HPL_{up}$ is a protection level upper limit, $HPL_{up,init}$ is an initial value of the protection level upper limit, $HPL_{up,old}$ is a stop value of the protection level upper limit, $HPL_{up,new}$ is an updated value of the protection level upper limit; $HPL_{mid}$ is a midpoint between the protection level upper limit and the protection level lower limit, and $TOL_{PL}$ is a protection level calculation tolerance;

a function $$f(PHL) = 2Q\left(\frac{HPL - b_q^{(0)}}{\sigma_q^{(0)}}\right) + \sum_{k=1}^{N_{faults}} p_{fault,k} Q\left(\frac{HPL - T_{k,q} - b_q^{(k)}}{\sigma_q^{(k)}}\right),$$

wherein, Q is a standard Gaussian distribution, $N_{faults}$ is a total number of the fault subset, k is the $k^{th}$ fault subset, $b_q^{(k)}$ is the effect of a standard offset $b_{nom,i}$ on the positioning solution $\hat{x}_q^{(k)}$ of the fault subset k, $\sigma_q^{(k)}$ is a standard deviation of the positioning solution $\hat{x}_q^{(k)}$ of the fault subset k, $p_{fault,k}$ is a prior probability of a fault subset k, $T_{k,q}$ is a threshold of the test statistics of the fault subset k.

Preferably, the protection level lower limit is calculated by the following method:

$$HPL_{low,init} = \max\left\{\begin{array}{l} Q^{-1}\left(\frac{PHMI_{HOR,ADJ}}{2}\right)\sigma_q^{(0)} + b_q^{(0)}, \\ \max_k Q^{-1}\left(\frac{PHMI_{HOR,ADJ}}{p_{fault,k}}\right)\sigma_q^{(k)} + T_{k,q} + b_q^{(k)} \end{array}\right\},$$

wherein, $PHMI_{HOR,ADJ}$ is a difference between a total integrity risk value and an unmonitored risk value, $b_q^{(k)}$ is the effect of the standard offset $b_{nom,i}$ on the positioning solution $\hat{x}_q^{(k)}$ of the fault subset k, $\sigma_q^{(k)}$ is a Standard deviation of the positioning solution $\hat{x}_q^{(k)}$ of fault subset k, $T_{k,q}$ is the threshold of the test statistics of the fault subset k, $p_{fault,k}$ is the prior probability of the fault subset k, $Q^{-1}(p)$ is a (1–p)quantile of the standard Gaussian distribution $$HPL_{up,init} = \max\left\{\begin{array}{l} Q^{-1}\left(\frac{PHMI_{HOR,ADJ}}{2(N_{faults}+1)}\right)\sigma_q^{(0)} + b_q^{(0)}, \\ \max_k Q^{-1}\left(\frac{PHMI_{HOR,ADJ}}{p_{fault,k}(N_{faults}+1)}\right)\sigma_q^{(k)} + T_{k,q} + b_q^{(k)} \end{array}\right\},$$

wherein, $PHMI_{HOR,ADJ}$ is a difference between a total integrity risk value and an unmonitored risk value, $b_q^{(k)}$ is the effect of the standard offset $b_{nom,i}$ on the positioning solution $\hat{x}_q^{(k)}$ of the fault subset k, $\sigma_q^{(k)}$ is a Standard deviation of the positioning solution $\hat{x}_q^{(k)}$ of the fault subset k, $T_{k,q}$ is the threshold of the test statistics of the fault subset k, $p_{fault,k}$ is a prior probability of the fault subset k, $N_{faults}$ is a total number of the fault subset, $Q^{-1}(p)$ is a (1−p)quantile of the standard Gaussian distribution.

Preferably, the difference between a total integrity risk value and an unmonitored risk value is calculated by the following method:

$$PHMI_{HOR,ADJ} = \frac{1}{2}PHMI_{HOR}\left(1 - \frac{P_{sat,not\_monitored} + P_{const,not\_monitored}}{PHMI_{VERT} + PHMI_{HOR}}\right),$$

wherein, $P_{sat,not\_monitored}$ and $P_{const,not\_monitored}$ are integrity risk values from unmonitored satellites and constellations, $PHMI_{VERT}$: total integrity budget vertical component, $PHMI_{HOR}$: total integrity budget horizontal component.

Preferably, the midpoint between the protection level upper limit and the protection level lower limit is calculated by the following method:

$$HPL_{mid} = \frac{1}{2}(HPL_{low,init} + HPL_{up,init}),$$

wherein, $HPL_{mid}$ is the midpoint between the protection level upper limit and the protection level lower limit, $HPL_{up,init}$ is an initial value of the protection level upper limit, $HPL_{up,init}$ is an initial value of the protection level upper limit.

Preferably, the pseudo-range error diagonal covariance matrix comprises an integrity matrix $C_{int}$ and a continuity matrix $C_{acc}$, which are calculated by the following method:

$$C_{int}(i, i) = \sigma_{URA,i}^2 + \sigma_{tropo,i}^2 + \sigma_{user,i}^2,$$

$$C_{acc}(i, i) = \sigma_{URE,i}^2 + \sigma_{tropo,i}^2 + \sigma_{user,i}^2,$$

wherein, $\sigma_{URA,i}$ and $\sigma_{URE,i}$ is a integrity support information sent from a ground to an airplane, $\sigma_{URA,i}$ is a Standard deviation of a ephemeris clock error of the satellite i, $\sigma_{URE,i}$ is a Standard deviation of a ephemeris clock error of the satellite i, for the accuracy and the continuity, $\sigma_{tropo,i}$ is a Standard deviation of the error caused by the satellite i on process delay, $\sigma_{user,i}$ is a standard deviation of the multipath and noise error of a user receiver with respect to the satellite i signal.

Preferably, a weighted matrix W is obtained by calculating the pseudo-range error diagonal covariance matrix;

weighted matrix $W = C_{int}^{-1}$, wherein, $C_{int}^{-1}$ is an inverse matrix of the integrity matrix $C_{int}$.

Preferably, the positioning solution of the full visible satellite is updated by the following method:

$\Delta x = (G^T W G)^{-1} G^T W \Delta PR$, wherein $\Delta x$ is an updated amount of the positioning solution of the full visible, W is a weighted matrix, a geometric matrix G is $N_{sat} \times (3+N_{const})$ matrix, $N_{sat}$ denotes the number of the satellite, $N_{const}$ denotes the number of the constellation, $\Delta PR$ is a difference between the pseudo-range measurement value and a desired value given by the last iteration based on the satellite location and the positioning solution.

Preferably, the positioning solution for the $k^{th}$ fault subset is calculated by the following method:

$$\Delta \hat{x}^{(k)} = \hat{x}^{(k)} - \hat{x}^{(0)} = (S^{(k)} - S^{(0)})y$$

$$S^{(k)} = (G^T W^{(k)} G)^{-1} G^T W^{(k)},$$

wherein, $\hat{x}^{(k)}$ is the positioning solution of the $k^{th}$ fault subset的, $\hat{x}^{(0)}$ is the positioning solution of the full visible satellite, $\Delta \hat{x}^{(k)}$ is a difference between the positioning solution of the $k^{th}$ fault subset and the positioning solution of the full visible satellite, y is a residual error below the $k^{th}$ fault subset, G is a geometric matrix, W is a weighted matrix.

Preferably, the threshold of the test statistics of the fault subset is calculated by the following method:

$$T_{k,q} = K_{fa,q}\sigma_{ss,q}^{(k)2},$$

wherein, $T_{k,q}$ is the threshold of the test statistics of the fault subset k, $K_{fa,k}$ is a quantile obtained by allocating the total integrity risk and the continuity risk budget to each subset, $\sigma_{ss,q}^{(k)2}$ is a variance of the difference $\Delta \hat{x}^{(k)}$ between the positioning solution of the full visible satellite and the positioning solution of the fault subset.

The H-ARAIM system of optimizing a horizontal protection level provided by the invention has a higher reliability in the calculation process.

The H-ARAIM system of optimizing a horizontal protection level provided by the invention improves the accuracy for the protection level calculation by an on-demand risk allocation method using the ratio of the number of the fault subset satellite to the number of the full visible satellite as a coefficient.

The H-ARAIM system of optimizing a horizontal protection level provided by the invention proposes a gradient ascent searching method for searching for the HPL value, which reduces the computational complexity, decreases the computation time, and facilitates the promotion of the performance upgrade of H-ARAIM.

It should be noted that the foregoing general description and the following detailed description are both exemplary and explanatory, and should not be used to limit the content that the present invention seeks to protect.

BRIEF DESCRIPTION OF THE DRAWINGS

More objectives, functions, and advantages of the present invention are illustrated through the following description of the implementation manners of the present invention with reference to the accompanying drawings.

DETAILED DESCRIPTION

Figure 1:
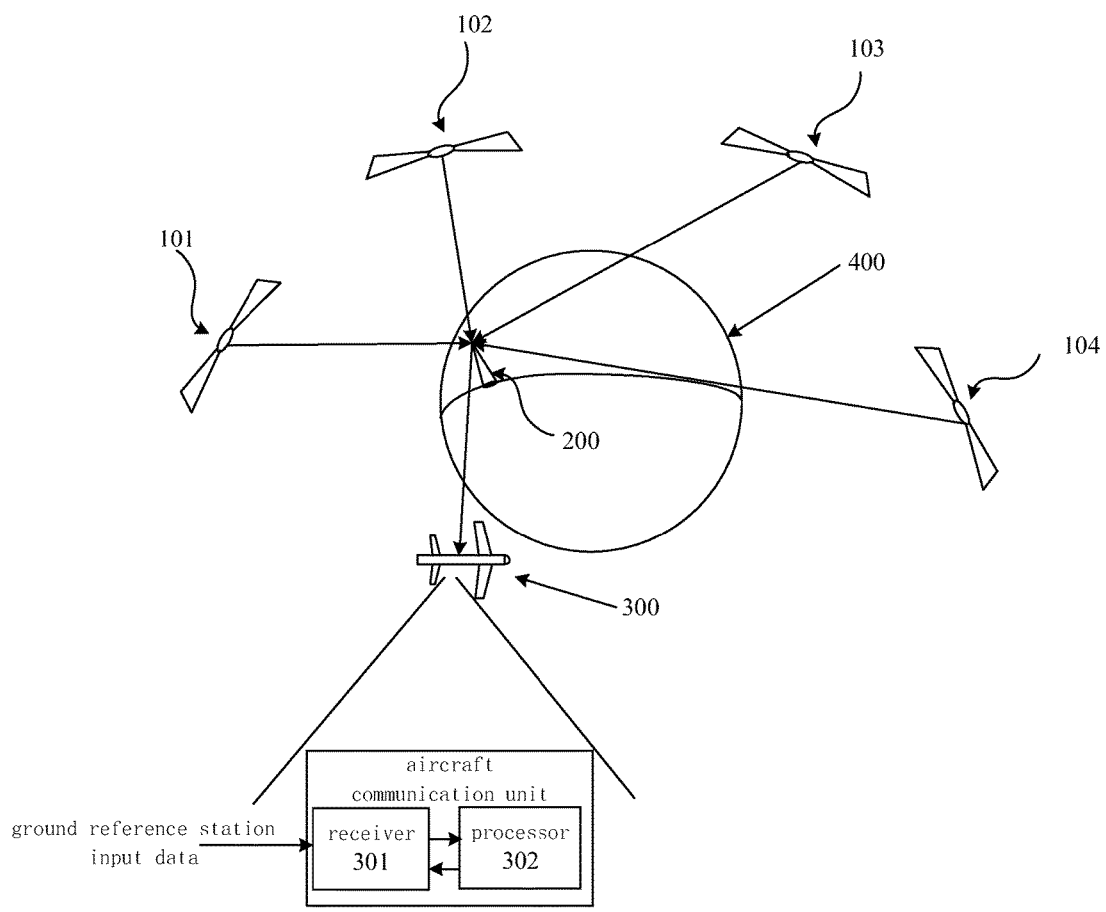
FIG. 1 illustrates a structure block diagram of an H-ARAIM system of optimizing the horizontal protection level of the invention.

With reference to the exemplary embodiments, the objectives and functions and the methods used to implement these objectives and functions of the present invention are described. However, the present invention is not limited to the exemplary embodiments disclosed in the following. The present invention may be implemented by using different forms. The specification substantially only helps a person skilled in the art to comprehensively understand specific details of the present invention.

The embodiments of the present invention are described below with reference to the accompanying drawings. The related technical terms should be well known to a person skilled in the art. In the accompanying drawings, the same reference numerals represent the same or similar components or the same or similar steps, unless otherwise described.

The contents of the invention are illustrated through particular embodiments. The object of the invention is to provide an H-ARAIM system of optimizing a horizontal protection level for a fault detection model using an orbit selection method in order to optimize the horizontal protection level. The optimization for the continuity and integrity risk allocation method and the protection level calculation is accomplished, thereby improving the accuracy for the calculation of the protection level and reducing the processing time.

At present, there are four global satellite navigation systems (referred in the invention as to constellations), i.e., global positioning system (GPS) of US, consisting of 24 satellites; "Glonass" system of Russia, consisting of 24 satellites; "Galile" system of Europe, consisting of 30 satellites; "BeiDou" system of China, consisting of 5 geostationary orbit satellites and 30 non-geostationary orbit satellites. The invention mainly monitors the abovementioned satellites and constellations and optimizes the horizontal protection level.

As shown in FIG. 1, shown is a structure block diagram of an H-ARAIM system of optimizing the horizontal protection level of the invention. The H-ARAIM system of optimizing the horizontal protection level of the invention comprises constellations, a ground reference station and an aircraft. The constellations described above in the embodiments are four present global satellite navigation systems, which are global positioning system 101 of US, "Glonass" system 102 of Russia, "Galile" system 103 of Europe, and "BeiDou" system 104 of China, respectively. Each of constellations has multiple satellites.

The ground reference station 200 is a reference station established on the plane of an Earth 400, i.e., an integrity support information (ISM) support station, for receiving the satellite coordinate data of the constellations (101, 102, 103 and 104) and processing the received satellite coordinate data into input data for the calculation of the horizontal protection level of an aircraft 300.

The aircraft 300 is built-in with a receiver 301 and a data processor 302, the receiver 301 is used for receiving the input data sent by the ground reference station 200, and transmitting the input data to the data processor 302 for the data processing.

Figure 2:
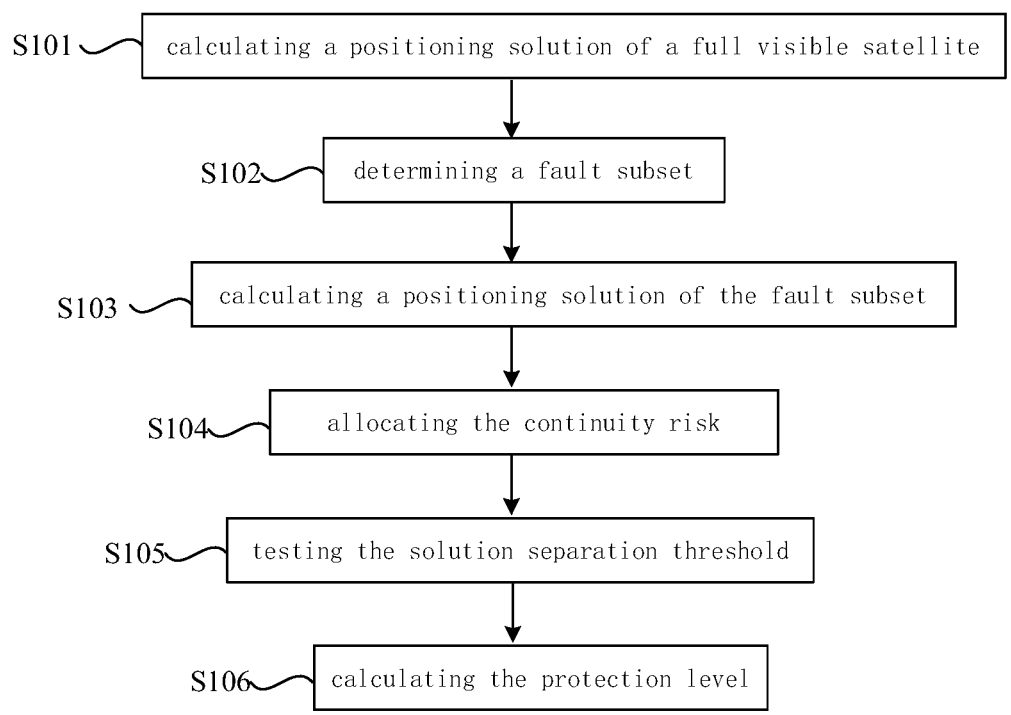
FIG. 2 illustrates a flow block diagram of optimizing the horizontal protection level of the invention.

As shown in FIG. 2, shown is a flow block diagram of optimizing the horizontal protection level of the invention. The H-ARAIM system of optimizing the horizontal protection level provided by the invention comprises the method steps as follows:

step S101. calculating a positioning solution of a full visible satellite.

According to the invention, the data processor 302 initially calculates a pseudo-range error diagonal covariance matrix, to obtain a weighted matrix W, and calculates the positioning solution of the full visible satellite according to a geometric matrix G and the weighted matrix W of the satellite.

The pseudo-range error diagonal covariance matrix comprises an integrity matrix $C_{int}$ and a continuity matrix $C_{acc}$, which are calculated by the following method:

$$C_{int}(i, i) = \sigma^2_{URA,i} + \sigma^2_{tropo,i} + \sigma^2_{user,i},$$

$$C_{acc}(i, i) = \sigma^2_{URE,i} + \sigma^2_{tropo,i} + \sigma^2_{user,i},$$

wherein, $\sigma_{URA,i}$ and $\sigma_{URE,i}$ are integrity support information sent from a ground station to an airplane, $\sigma_{URA,i}$ is a standard deviation of a ephemeris clock error of a satellite i, $\sigma_{URE,i}$ is a standard deviation of a ephemeris clock error of a satellite i, for the accuracy and the continuity, $\sigma_{tropo,i}$ is a standard deviation of the error caused by the satellite i on process delay, $\sigma_{user,i}$ is a standard deviation of the multipath and noise error of a user receiver with respect to the satellite i signal.

A weighted matrix W is obtained by calculating the pseudo-range error diagonal covariance matrix; the weighted matrix $W=C_{int}^{-1}$, wherein, $C_{int}^{-1}$ is an inverse matrix of the integrity matrix $C_{int}$.

The positioning solution of the full visible satellite is calculated by updating the weighted matrix W and the geometric matrix G and is updated by the following method:

$\Delta x = (G^T W G)^{-1} G^T W \Delta PR$, wherein $\Delta x$ is an updated amount of the positioning solution of the full visible satellite, W is a weighted matrix, a geometric matrix G is $N_{sat} \times (3+N_{const})$ matrix, $N_{sat}$ denotes the number of the satellite, $N_{const}$ denotes the number of the constellation, $\Delta PR$ is a difference between the pseudo-range measurement value and a desired value given by the last iteration based on the satellite location and the positioning solution.

The first three rows in the geometric matrix G of the embodiment are located in the same way as the traditional locating method and the each of the remaining rows corresponds to the reference clock of each constellation (global satellite navigation system), each constellation being numbered from 1 to $N_{const}$.

$G_{i,3+j}=1$ denotes that the satellite belongs to a constellation j, $G_{i,3+j}=0$ denotes others.

step s102. determining fault subsets.

In an ARAIM-based MHSS (multi-hypothesis solution separation) algorithm, it needs to traverse the fault detection models allowing all the possibilities under risks and list all the subsets which possibly needs to be monitored.

The MHSS algorithm may only protect the user from the fault with limited prior probability. If the prior probability of the fault is greater than or equal to $4 \times 10^{-8}$, it will be considered as inneglible. The receiver 301 determines which of the fault detection models needs to be monitored from the integrity support information (ISM) contents of the ground reference station 200. The integrity support information (ISM) does not explicitly specify the fault modes in need of being monitored and the allocation of the corresponding fault probabilities. Therefore, the receiver 301 makes judgment according to the integrity support information (ISM).

The data processor 302 calculates a maximum $N_{const}$ of the number of the simultaneously faulted constellations and a maximum $N_{sat}$ of the number of the simultaneously faulted satellites in need of monitoring according to the input parameters acquired by the receiver 301 from the integrity support information (ISM), the input parameters mainly being $P_{sat,i}$ and $P_{const,j}$.

It should be noted, in the invention, the number $N_{sat}$ of the satellite is the maximum of the number of simultaneously faulted satellites. The number $N_{const}$ of the constellation is the maximum of the number of the simultaneously faulted constellations.

The prior probabilities for each fault subset are defined as:

$$P_{ap,n_s} = C_N^{n_s}(P_{sat,i})^{n_s}(1-P_{sat,i})^{N-n_s},$$

$$P_{ap,n_c} = C_M^{n_c}(P_{const,j})^{n_c}(1-P_{const,j})^{M-n_c},$$

wherein, $n_s$ denotes the number of the simultaneously faulted satellites, $n_c$ denotes the number of the simultaneously faulted constellations; the user is tracking N satellites respectively belonging to M constellations. $C_N^{n_s}$ and $C_M^{n_c}$ are combinational calculations, respectively, for example:

$$C_b^a = \frac{b!}{a!(b-a)}.$$

Then, the maximum $N_{const}$ of the number of the simultaneously faulted constellations and the maximum $N_{sat}$ of the number of the simultaneously faulted satellites are calculated by the following formulae:

$$N_{sat} = \max\{n_s \mid 1-(P_{ap,0}+P_{ap,1}+L+P_{ap,n_s}) \le 4\times 10^{-8}\},$$

$$N_{const} = \max\{n_c \mid 1-(P_{ap,0}+P_{ap,1}+L+P_{ap,n_c}) \le 4\times 10^{-8}\},$$

$P_{sat,i}$ and $P_{const,j}$ are input parameters acquired by the receiver from ISM, $4\times 10^{-8}$ is a constant, for an integrity risk threshold of the fault which is not monitored by ARAIM. For example:

The number of the constellation that the user is tracking is 3, a value of $P_{const,j}$ is $10^{-4}$, then obtaining $$[1-(P_{ap,0}+P_{ap,1})]=2.99\times 10^{-8} \le 4\times 10^8,$$

accordingly, the maximum $N_{const}$ of the number of the simultaneously faulted constellations in need of monitoring is 1, likewise, the maximum $N_{sat}$ of the number of the simultaneously faulted satellites in need of monitoring may be obtained.

Finally, the maximum of the number of the orbital planes to be removed is determined from maximum $N_{const}$ of the number of the simultaneously faulted constellations and the maximum $N_{sat}$ of the number of the simultaneously faulted satellites, so as to obtain the number $N_{faults}$ of the fault subsets.

step s103. calculating the positioning solution of the fault subset.

For each fault subset k, the weighted matrix is calculated:

When the satellite i belongs to a satellite set corresponding to the fault subset, i.e., $i \in idx_k$, then $W^{(k)}(i,i)=C_{int}^{-1}(i,i)$, $C_{int}^{-1}$ is an inverse matrix of the integrity matrix $C_{int}$.

When the satellite i does not belong to the satellite set corresponding to the fault subset, i.e., $i \notin idx_k$, then $W^{(k)}(i,i)=0$.

For all the constellations j, they satisfy: $(G^T W^{(k)})_{3+j}=[0\ldots 0]^T$, when and only when all the constellations j belong to the satellite set corresponding to the fault subset, the removal of 3+j rows is performed on the geometric matrix G.

The positioning solution for the $k^{th}$ fault subset is calculated by the following method:

$$\Delta \hat{x}^{(k)} = \hat{x}^{(k)} - \hat{x}^{(0)} = (S^{(k)} - S^{(0)})y$$

$$S^{(k)} = (G^T W^{(k)} G)^{-1} G^T W^{(k)},$$

wherein, $\hat{x}^{(k)}$ is the positioning solution of the $k^{th}$ fault subset, $\hat{x}^{(0)}$ is the positioning solution of the full visible satellite, $\Delta \hat{x}^{(k)}$ is a difference between the positioning solution of the $k^{th}$ fault subset and the positioning solution of the full visible satellite, y is a residual error below the $k^{th}$ fault subset, G is a geometric matrix, W is a weighted matrix.

The variance of the positioning solution $\hat{x}_q^{(k)}$ of the fault subset k is:

$\sigma_q^{(k)2}=(G^T W^{(k)} G)_{q,q}^{-1}$, wherein, q=1, 2, 1 and 2 respectively denotes two direction vectors in the horizontal plane.

The effect of the standard offset $b_{nom,i}$ on the positioning solution $\hat{x}_q^{(k)}$ of the fault subset k is:

$$b_q^{(k)} = \sum_{i=1}^{N_{sat}} |S_{q,i}^{(k)}| b_{nom,i},$$

the variance of the difference $\Delta \hat{x}^{(k)}$ between the positioning solution of the full visible satellite and the positioning solution of the fault subset is:

$\sigma_{ss,q}^{(k)2} = e_q^T (S^{(k)} - S^{(0)}) C_{acc} (S^{(k)} - S^{(0)})^T e_q$, wherein, $e_q$ denotes a vector in which the $q^{th}$ element is 1 and other elements are 0, $C_{acc}$ is a continuity matrix.

step s104. continuity risk allocation.

The continuity risks of the invention are allocated in terms of the number of the satellite as required, and the constellation layer continuity risk allocation and the orbital plane continuity risk allocation are respectively performed.

(1) for the constellation layer continuity risk allocation, the fault subset k comprises the number $n_k$ of the satellite, then the continuity risk allocated to the fault subset k is:

$$P_{fa}^{(k)} = P_{FA\_HOR} \cdot \frac{10+n_k}{\sum_{k=1}^{N_{fault}} 10+n_k},$$

wherein, $N_{faults}$ is a total number of the fault subset, i.e., a maximum number of the fault subset with orbital planes simultaneously removed, $P_{FA\_HOR}$ is the continuity risk in which the orbital planes are allocated to the fault subset k of the detected constellation layer for the homogeneous constellations.

(2) for the orbital plane continuity risk allocation, the allocation for the orbital plane continuity risk is associated with the detection result of the constellation layer, it requires to elect the constellation that is valid or has the largest detection result to perform the continuity risk allocation on its orbital plane. In the invention, the threshold of the monitor statistics of the fault subsets is set by the continuity risk so as to calculate the protection level.

For example, the fault subset of the detected constellation layer is k, for the homogeneous constellations (such as GPS, GLONASS or Galileo), the orbital plane continuity risk allocation is calculated by the following method:

$$P_{FA\_HOR}^{(km)} = P_{fa}^{(k)} \cdot \frac{n_{km}}{10 + n_k}, m = 1, 2, \ldots,$$

wherein, $n_{km}$ is the number of the visible satellite of the $m^{th}$ orbital plane of the corresponding fault constellation of the constellation layer fault subset k, $P_{fa}^{(k)}$ is the continuity risk allocated to the fault subset k if the constellation layer fault subset k comprises the number $n_k$ of the satellite.

For the heterogeneous constellation (such as BDS), assuming that the number of the visible medium earth orbit (MEO) satellite belonging to the constellation is $n_{MEO}$, the number of the geostationary earth orbit (GEO) satellite is $n_{GEO}$, the number of the inclined geo-synchronization orbit (IGSO) satellite is $n_{IGSO}$; the fault subset k of the medium earth orbit (MEO) is taken as an example in the embodiments, and the orbital plane continuity risk allocation is calculated by the following method:

$$P_{FA\_MEO} = P_{fa}^{(k)} \cdot \frac{n_{MEO} \cdot p_{MEO}}{P_{const,j} + \Sigma n \cdot p_{MEO}},$$

wherein, n is the number of the satellite included in the orbital plane, $p_{MEO}$ is the fault probability for such orbital plane satellites, $P_{const,j}$ is the input parameter acquired by the receiver from ISM (integrity support information), in some embodiments, the input parameter $P_{sat,i}$ acquired by the receiver from ISM (integrity support information) may be employed.

step s105. test of the solution separation threshold.

If each difference between the positioning solution of the full visible satellite and the positioning solution of the fault subset is within a predetermined threshold, the receiver successfully passed the error monitoring, began to calculate the protection level, and effectively monitored integrity indexes such as threshold, accuracy and the like. If the predetermined threshold is found to be exceeded, it is firmly believed that the fault is present. For elimination, the cyclical test or chi-square test is performed on the remaining fault subsets. If the fault subset satisfying the requirements can be found, the step will be carried out again until passing the error monitoring.

For each fault subset, each coordinate direction is subject to the solution separation threshold test. For the fault subset k, the threshold with the coordinate of q is marked as $T_{k,q}$ then the threshold of the test statistics of the fault subset is calculated by the following method:

$$T_{k,q} = K_{fa,q} \sigma_{ss,q}^{(k)2},$$

wherein, $T_{k,q}$ is a threshold of the test statistics of the fault subset k, $K_{fa,q}$ is an inverse function (quantile) of the probability cumulative distribution function, $\sigma_{ss,q}^{(k)2}$ is a variance of the difference $\Delta \hat{x}^{(k)}$ between the positioning solution of the full visible satellite and the positioning solution of the fault subset.

The threshold of the test statistics of the abovementioned fault subset is tested; when the difference between the positioning solution of the full visible satellite and the positioning solution of the fault subset is within the threshold of the test statistics of the fault subset, the receiver 301 calculates the protection level; if not passed, troubleshooting is carried out.

Since the total number $N_{faults}$ of the fault subset and the risk $P_{FA}$ allocated from the orbital plane to the fault subset are constants in a single positioning process, the threshold $T_{k,q}$ of the test statistics of the fault subset mainly depends on $\sigma_{ss,q}^{(k)}$.

The inverse function (quantile) of the probability cumulative distribution function is calculated by the following way:

$$K_{fa,q} = Q^{-1}\left(\frac{P_{fa}^{(k)}}{4}\right),$$

in which, $P_{fa}^{(k)}$ is the continuity risk allocated to the fault subset k, $Q^{-1}$ is the inverse function (quantile) of the standard Gaussian distribution.

The variance of the difference $\Delta \hat{x}^{(k)}$ between the positioning solution of the full visible satellite and the positioning solution of the fault subset is calculated by the following way: $\Delta_{ss,q}^{(k)2} = e_q^T(S^{(k)} - S^{(0)})C_{acc}(S^{(k)} - S^{(0)})^T e_q$, in which, $e_q$ denotes a vector in which the $q^{th}$ element is 1 and other elements are 0, $C_{acc}$ is a continuity matrix.

In some embodiments, in addition to the solution separation threshold test, the chi-square test is carried out. In a reference algorithm, the chi-square test is an integrity test, which can test other faults besides normal fault subset without increasing the calculation. For the chi-square test, those skilled in the art performs tests according to the prior art, which is not repeated here.

step s106. calculation of protection level

Figure 3A:
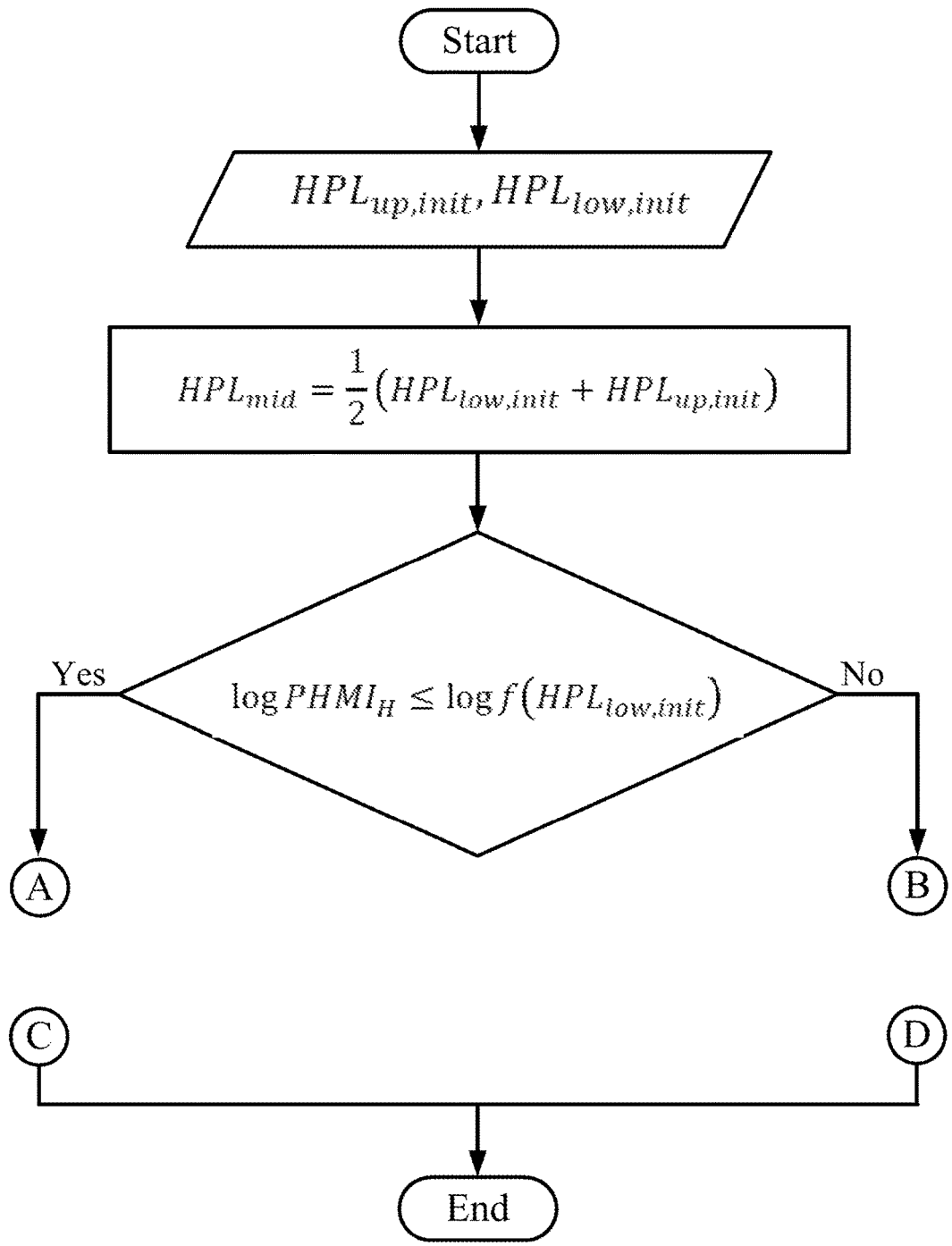
FIG. 3 illustrates a flow block diagram of calculating the protection level of the invention.
Figure 3B:
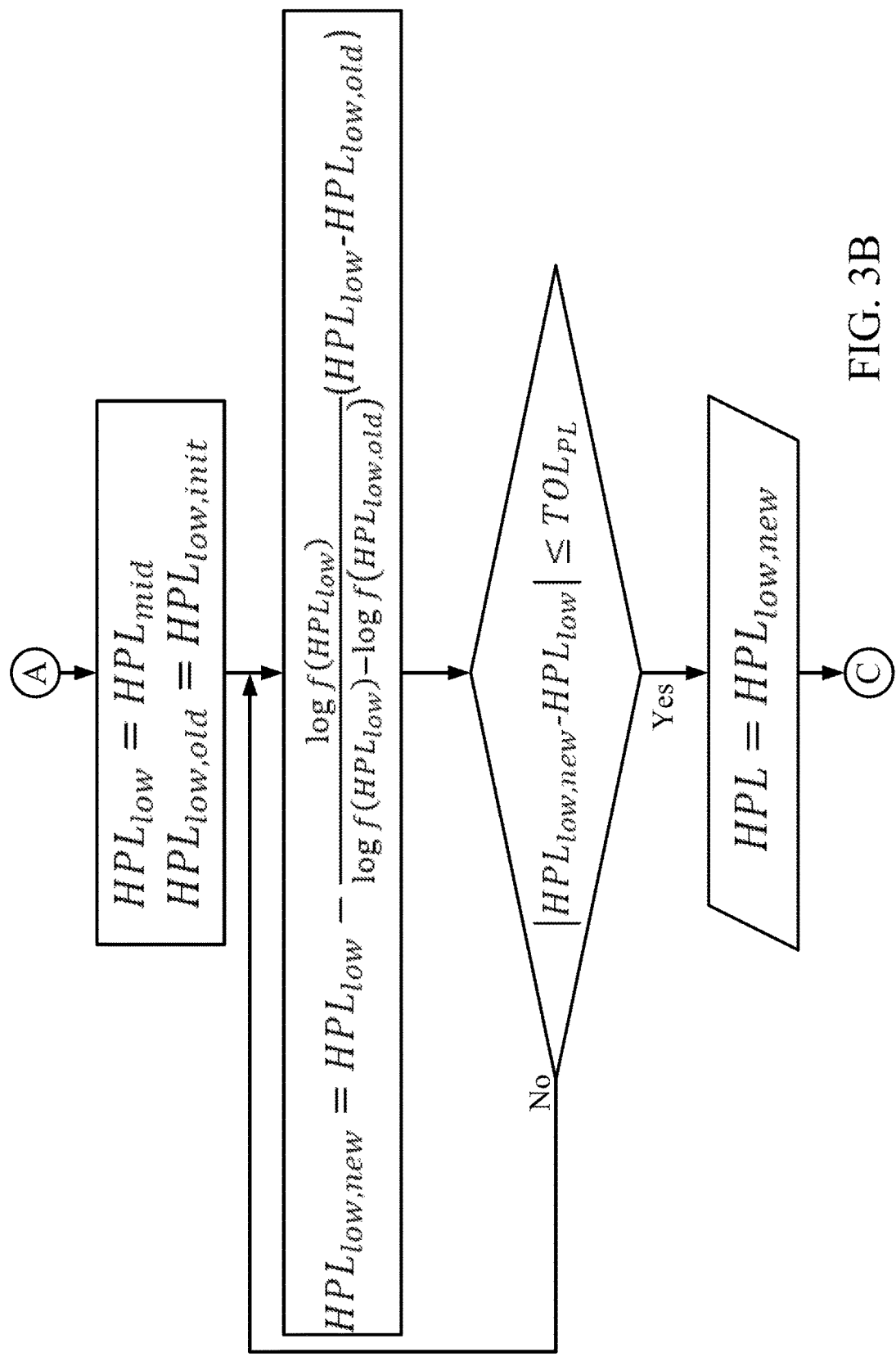
Figure 3C:
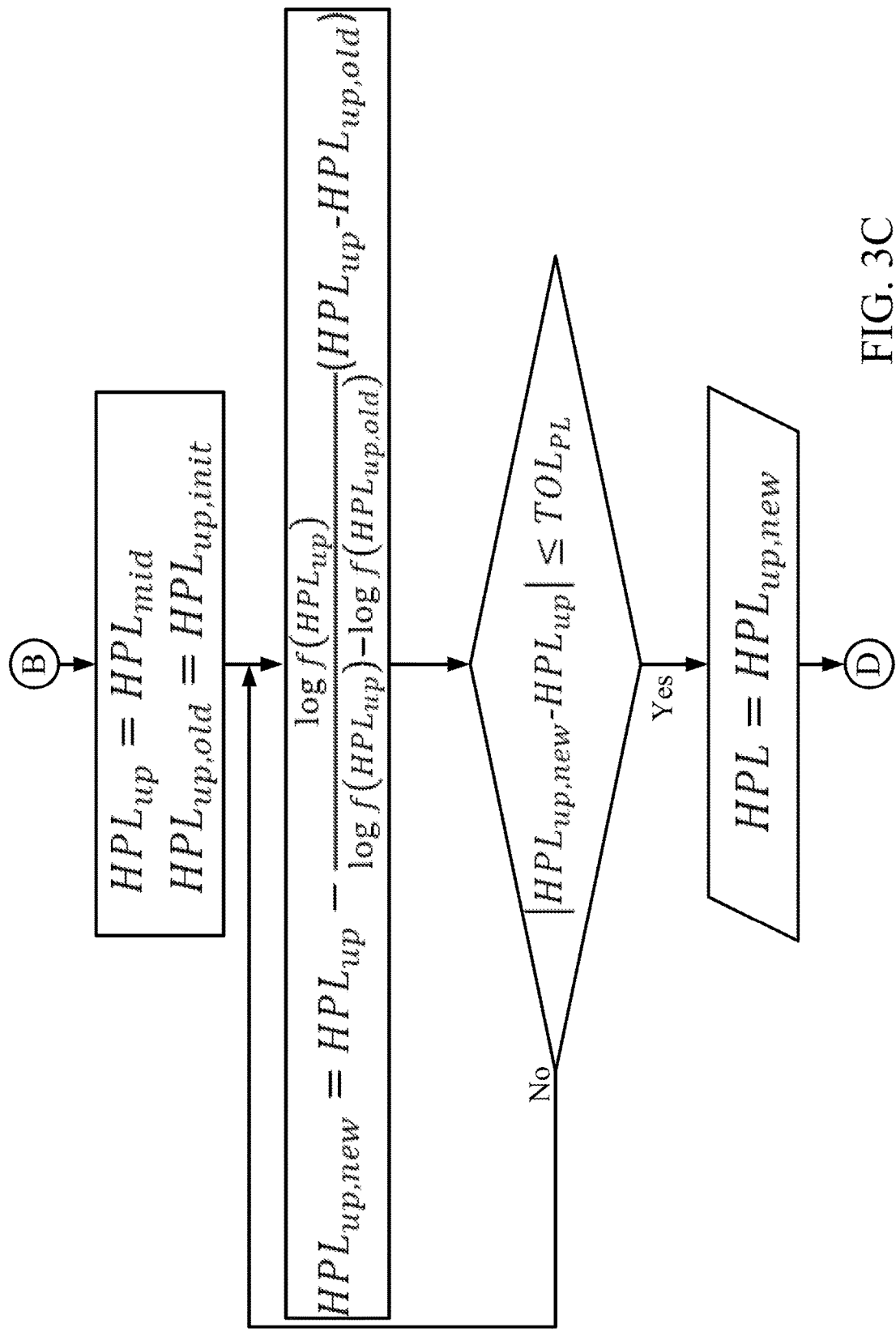
Figure 4:
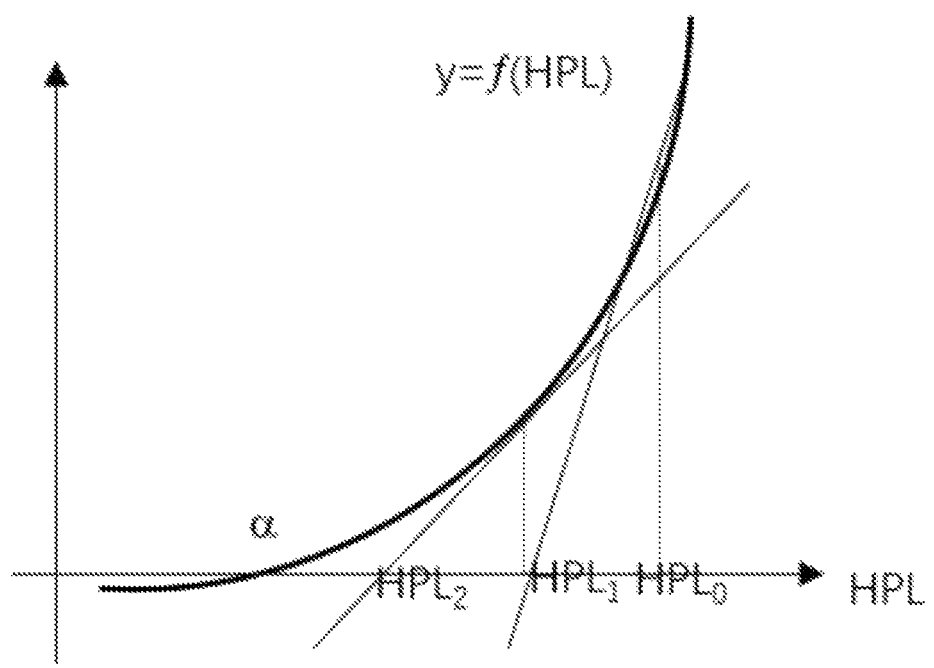
FIG. 4 illustrates a schematic diagram of an iterative curve for the protection level calculation of the invention.

As shown in FIG. 3, shown is a flow block diagram of the calculation of the protection level of the invention. As shown in FIG. 4, shown is a schematic diagram of an iterative curve for the protection level calculation of the invention. When the difference between the positioning solution of the full visible satellite and the positioning solution of the fault subset calculated by the data process 302 is within the threshold of the test statistics of the fault subset, the data processor 302 feedbacks to the receiver 301 and the receiver 301 begins to calculate the protection level; the protection level is calculated by the following method:

calculating a protection level lower limit, a protection level upper limit and a midpoint between the protection level upper limit and the protection level lower limit.

The protection level lower limit is calculated by the following method:

$$HPL_{low,init} = \max\left\{\begin{array}{l} Q^{-1}\left(\frac{PHMI_{HOR,ADJ}}{2}\right)\sigma_q^{(0)} + b_q^{(0)}, \\ \max_k Q^{-1}\left(\frac{PHMI_{HOR,ADJ}}{p_{fault,k}}\right)\sigma_q^{(k)} + T_{k,q} + b_q^{(k)} \end{array}\right\},$$

wherein, $PHMI_{HOR,ADJ}$ is a difference between a total integrity risk value and an unmonitored risk value, $b_q^{(k)}$ is the effect of the standard offset $b_{nom,i}$ on the positioning solution $\hat{x}_q^{(k)}$ of the fault subset k, $\sigma_q^{(k)}$ is a standard deviation of the positioning solution $\hat{x}_q^{(k)}$ of fault subset k, $T_{k,q}$ is the threshold of the test statistics of the fault subset k, $p_{fault,k}$ is the prior probability of the fault subset k, and $Q^{-1}(p)$ is a (1−p)quantile of the standard Gaussian distribution.

The protection level upper limit is calculated by the following method:

$$HPL_{up,init} = \max\left\{ \begin{array}{l} Q^{-1}\left(\dfrac{PHMI_{HOR,ADJ}}{2(N_{faults}+1)}\right)\sigma_q^{(0)} + b_q^{(0)}, \\ \max_k Q^{-1}\left(\dfrac{PHMI_{HOR,ADJ}}{p_{fault,k}(N_{faults}+1)}\right)\sigma_q^{(k)} + T_{k,q} + b_q^{(k)} \end{array} \right\},$$

wherein, $PHMI_{HOR,ADJ}$ is a difference between a total integrity risk value and an unmonitored risk value, $b_q^{(k)}$ is the effect of the standard offset $b_{nom,i}$ on the positioning solution $\hat{x}_q^{(k)}$ of the fault subset k, $\sigma_q^{(k)}$ is a standard deviation of the positioning solution $\hat{x}_q^{(k)}$ of fault subset k, $T_{k,q}$ is the threshold of the test statistics of the fault subset k, $p_{fault,k}$ is the prior probability of the fault subset k, $N_{faults}$ is a total number of the fault subset, and $Q^{-1}(p)$ is a $(1-p)$quantile of the standard Gaussian distribution.

In the abovementioned process, the difference between the total integrity risk value and the unmonitored risk value is calculated by the following method:

$$PHMI_{HOR,ADJ} = \frac{1}{2}PHMI_{HOR}\left(1 - \frac{P_{sat,not\_monitored} + P_{const,not\_monitored}}{PHMI_{VERT} + PHMI_{HOR}}\right),$$

wherein, $P_{sat,not\_monitored}$ and $P_{const,not\_monitored}$ are integrity risk values from unmonitored satellites and constellations, $PHMI_{VERT}$: a total integrity budget vertical component, $PHMI_{HOR}$: a total integrity budget horizontal component.

The midpoint between the protection level upper limit and the protection level lower limit is calculated by the following method:

$$HPL_{mid} = \frac{1}{2}(HPL_{low,init} + HPL_{up,init}),$$

in which, $HPL_{mid}$ is the midpoint between the protection level upper limit and the protection level lower limit, $HPL_{up,init}$ is an initial value of the protection level upper limit, and $HPL_{up,init}$ is an initial value of the protection level upper limit.

For the calculation of the protection level (HPL), the more the risks allocated to each fault subset are, the smaller the calculated value of the protection level (HPL) is, that is, the risks are inversely proportional to the protection level:

$$HPL = \max\left\{K_{HMI,0}\sigma^{(0)} + b^{(0)}, \max_k(K_{HMI,k}\sigma^{(k)} + K_{fa,k}\sigma_{ss}^{(k)} + b^{(k)})\right\}.$$

$K_{HMI,0}$, $K_{HMI,k}$, $K_{fa,k}$ are quantiles obtained by allocating the total integrity risk and the continuity risk to each subset.

The total integrity risks are allocated to each fault subset, at this point, the protection level (HPL) of each fault subset should be a minimum, and the obtained final protection level should be a searching lower bound; the integrity risk is calculated by the obtained protection level (HPL) at this time, which will go beyond the required value of the relevant performance index.

The protection level calculation is performed by the following way in the invention:

when the protection level takes a midpoint, if $\log PHMI_{HOR} \leq \log f(HPL_{low,init})$, then:

$HPL_{low} = HPL_{mid}$
$HPL_{low,old} = HPL_{low,init}$, looping through:

$HPL_{low,new} =$ $$HPL_{low} - \frac{\log f(HPL_{low})}{\log f(HPL_{low}) - \log f(HPL_{low,old})}(HPL_{low} - HPL_{low,old}),$$

a loop condition is: $|HPL_{low,new} - HPL_{low}| \leq TOL_{PL}$, an output protection level: $HPL = HPL_{low,new}$;

otherwise:

$HPL_{up} = HPL_{mid}$
$HPL_{up,old} = HPL_{up,init}$, looping through:

$HPL_{up,new} =$ $$HPL_{up} - \frac{\log f(HPL_{up})}{\log f(HPL_{up}) - \log f(HPL_{up,old})}(HPL_{up} - HPL_{up,old}),$$

the loop condition is: $|HPL_{up,new} - HPL_{up}| \leq TOL_{PL}$, the output protection level: $HPL = HPL_{up,new}$;

wherein, $PHMI_{HOR}$ is a total integrity budget horizontal component, $HPL_{low}$ is a protection level lower limit, $HPL_{low,init}$ is an initial value of the protection level lower limit, $HPL_{low,old}$ is a stop value of the protection level lower limit, and $HPL_{low,new}$ is an updated value of the protection level lower limit;

$HPL_{up}$ is a protection level upper limit, $HPL_{up,init}$ is an initial value of the protection level upper limit, $HPL_{up,old}$ is a stop value of the protection level upper limit, $HPL_{up,new}$ is an updated value of the protection level upper limit; $HPL_{mid}$ is a midpoint between the protection level upper limit and the protection level lower limit, and $TOL_{PL}$ is a protection level calculation tolerance;

a function $f(PHL) = 2Q\left(\dfrac{HPL - b_q^{(0)}}{\sigma_q^{(0)}}\right) + \sum_{k=1}^{N_{faults}} p_{fault,k} Q\left(\dfrac{HPL - T_{k,q} - b_q^{(k)}}{\sigma_q^{(k)}}\right),$ wherein, Q is a standard Gaussian distribution, $N_{faults}$ is a total number of the fault subset, k is the $k^{th}$ fault subset, $b_q^{(k)}$ is the effect of a standard offset $b_{nom,i}$ on the positioning solution $\hat{x}_q^{(k)}$ of the fault subset k, $\sigma_q^{(k)}$ is a standard deviation of the positioning solution $\hat{x}_q^{(k)}$ of the fault subset k, $p_{fault,k}$ is a prior probability of a fault subset k, $T_{k,q}$ is a threshold of the test statistics of the fault subset k.

The method of optimizing the horizontal protection level of the H-ARAIM provided by the invention initially distributes the continuity risks according to the prior probabilities of each fault subset, and then uses a mathematical gradient ascent method to seek for the optimal allocation scheme for the integrity risks; the obtained HPL is optimized by 8.6% in comparison with an average dichotomization, and the availability level achieves the degree that the target function method may realize.

The method of optimizing the horizontal protection level of the H-ARAIM provided by the invention has a higher reliability in the calculation process.

The method of optimizing the horizontal protection level of the H-ARAIM provided by the invention improves the accuracy for the protection level calculation by an on-demand risk allocation method using the ratio of the number of the fault subset satellite to the number of the full visible satellite as a coefficient.

The method of optimizing the horizontal protection level provided by the invention proposes a gradient ascent searching method for searching for the HPL value, which reduces the computational complexity, decreases the computation time, and facilitates the promotion of the performance upgrade of H-ARAIM.

With reference to the description and practice of the present invention disclosed herein, other embodiments of the present invention can be easily conceived of and understood by a person skilled in the art. The description and embodiments are only considered to be exemplary, and the actual scope and theme of the present invention are defined by the claims.

What is claimed is:

1. An H-ARAIM system of optimizing a horizontal protection level, wherein the system comprises constellations, a ground reference station and an aircraft, the ground reference station is used for receiving a satellite coordinate data of the constellations, and processing the received satellite coordinate data into an input data for the calculation of an aircraft horizontal protection level, the aircraft is built-in with a receiver and a data processor, the receiver is used for the input data sent by the ground reference station, and transmitting the input data to the data processor for the data processing as follows:

calculating a pseudo-range error diagonal covariance matrix to obtain a weighted matrix W, and calculating a positioning solution of a full visible satellite according to a satellite geometric matrix G and the weighted matrix W;

according to an input parameter acquired by the receiver from the ground reference station, calculating a maximum of the number of the simultaneously faulted constellations and a maximum of the number of the simultaneously faulted satellites in need of monitoring, determining a maximum of the number of the orbital plane to be removed, so as to obtain the number of the fault subset;

calculating positioning solutions for each fault subset by the difference between the positioning solution of the full visible satellite and the positioning solution of the fault subset;

performing a constellation layer continuity risk allocation and an orbital plane continuity risk allocation on each fault subset according to the number of the satellite;

when a difference between a positioning solution of the full visible satellite and a positioning solution of the fault subset is within a threshold of a fault subset monitor system statistical magnitude, calculating the threshold of the fault subset test statistics;

when the receiver begins to calculate the protection level, the protection level is calculated by the following method:

calculating a protection level lower limit and a protection level upper limit and a midpoint between the protection level upper limit and the protection level lower limit, when the protection level takes the midpoint, if log $PHMI_{HOR} \leq \log f(HPL_{low,init})$, then:

$HPL_{low} = HPL_{mid}$
$HPL_{low,old} = HPL_{low,init}$, looping through:

$HPL_{low,new} = HPL_{low} - \frac{\log f(HPL_{low})}{\log f(HPL_{low}) - \log f(HPL_{low,old})}(HPL_{low} - HPL_{low,old})$, a loop condition is: $|HPL_{low,new} - HPL_{low}| \leq TOL_{PL}$, an output protection level: $HPL = HPL_{low,new}$;

otherwise:

$HPL_{up} = HPL_{mid}$
$HPL_{up,old} = HPL_{up,init}$, looping through:

$HPL_{up,new} = HPL_{up} - \frac{\log f(HPL_{up})}{\log f(HPL_{up}) - \log f(HPL_{up,old})}(HPL_{up} - HPL_{up,old})$, the loop condition is: $|HPL_{up,new} - HPL_{up}| \leq TOL_{PL}$, the output protection level: $HPL = HPL_{up,new}$;

wherein, $PHMI_{HOR}$ is a total integrity budget horizontal component, $HPL_{low}$ is a protection level lower limit, $HPL_{low,init}$ is an initial value of the protection level lower limit, $HPL_{low,old}$ is a stop value of the protection level lower limit, and $HPL_{low,new}$ is an updated value of the protection level lower limit;

$HPL_{up}$ is a protection level upper limit, $HPL_{up,init}$ is an initial value of the protection level upper limit, $HPL_{up,old}$ is a stop value of the protection level upper limit, $HPL_{up,new}$ is an updated value of the protection level upper limit; $HPL_{mid}$ is a midpoint between the protection level upper limit and the protection level lower limit, and $TOL_{PL}$ is a protection level calculation tolerance;

a function $f(PHL) = 2Q\left(\frac{HPL - b_q^{(0)}}{\sigma_q^{(0)}}\right) + \sum_{k=1}^{N_{faults}} p_{fault,k} Q\left(\frac{HPL - T_{k,q} - b_q^{(k)}}{\sigma_q^{(k)}}\right)$, wherein, Q is a standard Gaussian distribution, $N_{faults}$ is a total number of the fault subset, k is the $k^{th}$ fault subset, $b_q^{(k)}$ is the effect of a standard offset $b_{nom,i}$ on the positioning solution $\hat{x}_q^{(k)}$ of the fault subset k, $\sigma_q^{(k)}$ is a standard deviation of the positioning solution $\hat{x}_q^{(k)}$ of the fault subset k, $p_{fault,k}$ is a prior probability of a fault subset k, $T_{k,q}$ is a threshold of the test statistics of the fault subset k.

2. The system according to claim 1, wherein, the protection level lower limit is calculated by the following method:

$HPL_{low,init} = \max\left\{\begin{array}{l}Q^{-1}\left(\frac{PHMI_{HOR,ADJ}}{2}\right)\sigma_q^{(0)} + b_q^{(0)}, \\ \max_k Q^{-1}\left(\frac{PHMI_{HOR,ADJ}}{p_{fault,k}}\right)\sigma_q^{(k)} + T_{k,q} + b_q^{(k)}\end{array}\right\}$, wherein, $PHMI_{HOR,ADJ}$ is a difference between a total integrity risk value and an unmonitored risk value, $b_q^{(k)}$ is the effect of the standard offset $b_{nom,i}$ on the positioning solution $\hat{x}_q^{(k)}$ of the fault subset k, $\sigma_q^{(k)}$ is a standard deviation of the positioning solution $\hat{x}_q^{(k)}$ of fault subset k, $T_{k,q}$ is the threshold of the test statistics of the fault subset k, $p_{fault,k}$ is the prior probability of the fault subset k, $Q^{-1}(p)$ is a (1-p)quantile of the standard Gaussian distribution.

3. The system according to claim 1, wherein, the protection level upper limit is calculated by the following method:

$$HPL_{up,init} = \max\left\{\begin{array}{l} Q^{-1}\left(\dfrac{PHMI_{HOR,ADJ}}{2(N_{faults}+1)}\right)\sigma_q^{(0)} + b_q^{(0)}, \\ \max_k Q^{-1}\left(\dfrac{PHMI_{HOR,ADJ}}{p_{fault,k}(N_{faults}+1)}\right)\sigma_q^{(k)} + T_{k,q} + b_q^{(k)} \end{array}\right\},$$

wherein, $PHMI_{HOR,ADJ}$ is a difference between a total integrity risk value and an unmonitored risk value, $b_q^{(k)}$ is the effect of the standard offset $b_{nom,i}$ on the positioning solution $\hat{x}_q^{(k)}$ of the fault subset k, $\sigma_q^{(k)}$ is a Standard deviation of the positioning solution $\hat{x}_q^{(k)}$ of the fault subset k, $T_{k,q}$ is the threshold of the test statistics of the fault subset k, $p_{fault,k}$ is a prior probability of the fault subset k, $N_{faults}$ is a total number of the fault subset, $Q^{-1}(p)$ is a (1-p)quantile of the standard Gaussian distribution.

4. The system according to claim 3, wherein, a difference between a total integrity risk value and an unmonitored risk value is calculated by the following method:

$$PHMI_{HOR,ADJ} = \frac{1}{2}PHMI_{HOR}\left(1 - \frac{P_{sat,not\_monitored} + P_{const,not\_monitored}}{PHMI_{VERT} + PHMI_{HOR}}\right),$$

wherein, $P_{sat,not\_monitored}$ and $P_{const,not\_monitored}$ are integrity risk values from unmonitored satellites and constellations, $PHMI_{VERT}$: a total integrity budget vertical component, $PHMI_{HOR}$: a total integrity budget horizontal component.

5. The system according to claim 1, wherein, the midpoint between the protection level upper limit and the protection level lower limit is calculated by the following method:

$$HPL_{mid} = \frac{1}{2}(HPL_{low,init} + HPL_{up,init}),$$

wherein, $HPL_{mid}$ is the midpoint between the protection level upper limit and the protection level lower limit, $HPL_{up,init}$ is an initial value of the protection level upper limit, $HPL_{up,init}$ is an initial value of the protection level upper limit.

6. The system according to claim 1, wherein, the pseudo-range error diagonal covariance matrix comprises an integrity matrix $C_{int}$ and a continuity matrix $C_{acc}$, which are calculated by the following method:

$$C_{int}(i,i) = \sigma_{URA,i}^2 + \sigma_{tropo,i}^2 + \sigma_{user,i}^2,$$

$$C_{acc}(i,i) = \sigma_{URE,i}^2 + \sigma_{tropo,i}^2 + \sigma_{user,i}^2,$$

wherein, $\sigma_{URA,i}$ and $\sigma_{URE,i}$ are integrity support information sent from a ground station to an airplane, $\sigma_{URA,i}$ is a standard deviation of a ephemeris clock error of a satellite i, $\sigma_{URE,i}$ is a standard deviation of a ephemeris clock error of a satellite i, for the accuracy and the continuity, $\sigma_{tropo,i}$ is a Standard deviation of the error caused by the satellite i on process delay, $\sigma_{user,i}$ is a Standard deviation of the multipath and noise error of a user receiver with respect to the satellite i signal.

7. The system according to claim 6, wherein, a weighted matrix W is obtained by calculating the pseudo-range error diagonal covariance matrix;

the weighted matrix $W = C_{int}^{-1}$, wherein, $C_{int}^{-1}$ is an inverse matrix of the integrity matrix $C_{int}$.

8. The system according to claim 1, wherein, the positioning solution of the full visible satellite is updated by the following method:

$\Delta x = (G^T W G)^{-1} G^T W \Delta PR$, wherein $\Delta x$ is an updated amount of the positioning solution of the full visible satellite, W is a weighted matrix, a geometric matrix G is $N_{sat} \times (3+N_{const})$ matrix, $N_{sat}$ denotes the number of the satellite, $N_{const}$ denotes the number of the constellation, $\Delta PR$ is a difference between the pseudo-range measurement value and a desired value given by the last iteration based on the satellite location and the positioning solution.

9. The system according to claim 1, wherein, the positioning solution for the $k^{th}$ fault subset is calculated by the following method:

$$\Delta \hat{x}^{(k)} = \hat{x}^{(k)} - \hat{x}^{(0)} = (S^{(k)} - S^{(0)})y$$

$$S^{(k)} = (G^T W^{(k)} G)^{-1} G^T W^{(k)},$$

wherein, $\hat{x}^{(k)}$ is the positioning solution of the $k^{th}$ fault subset, $\hat{x}^{(0)}$ is the positioning solution of the full visible satellite, $\Delta \hat{x}^{(k)}$ is a difference between the positioning solution of the $k^{th}$ fault subset and the positioning solution of the full visible satellite, y is a residual error below the $k^{th}$ fault subset, G is a geometric matrix, W is a weighted matrix.

10. The system according to claim 1, wherein, the threshold of the test statistics of the fault subset is calculated by the following method:

$$T_{k,q} = K_{fa,q} \sigma_{ss,q}^{(k)2},$$

wherein, $T_{k,q}$ is the threshold of the test statistics of the fault subset k, $K_{fa,k}$ is a quantile obtained by allocating the total integrity risk and the continuity risk budget to each subset, $\sigma_{ss,q}^{(k)2}$ is a variance of the difference $\Delta \hat{x}^{(k)}$ between the positioning solution of the full visible satellite and the positioning solution of the fault subset.

* * * * *